July 29, 1941.  E. H. HAUX  2,251,130
COATING COMPOSITION FOR MOLDS, ETC
Filed May 17, 1938
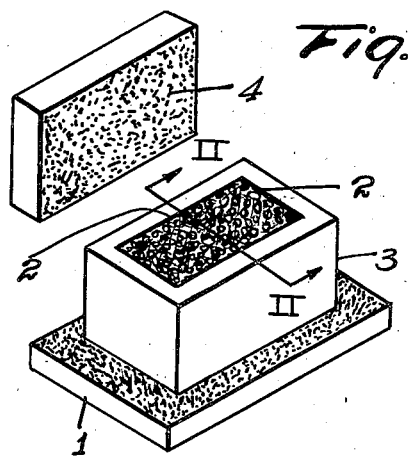
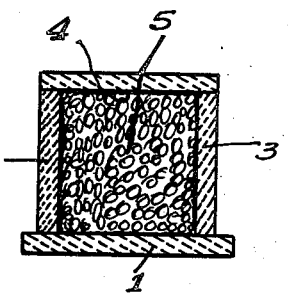
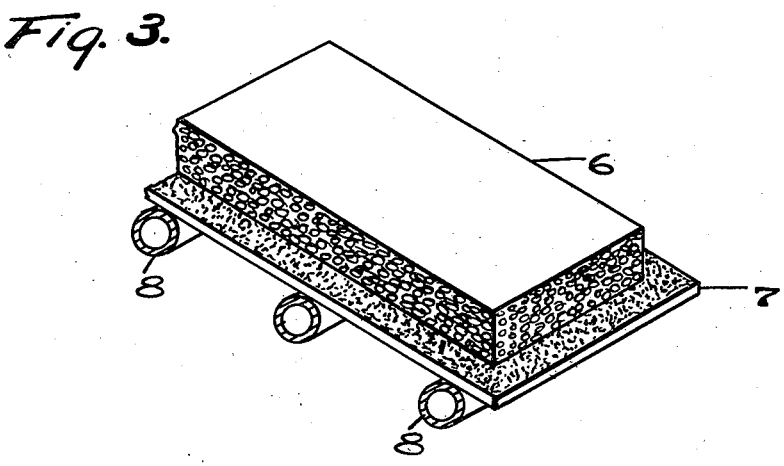
INVENTOR.
ELMER H. HAUX
BY Bradley & Bee
ATTORNEYS.

Patented July 29, 1941

2,251,130

UNITED STATES PATENT OFFICE 2,251,130

COATING COMPOSITION FOR MOLDS, ETC.

Elmer H. Haux, Tarentum, Pa., assignor to Pittsburgh Plate Glass Company, Allegheny County, Pa., a corporation of Pennsylvania Application May 17, 1938, Serial No. 208,394

2 Claims. (Cl. 49—65)

The present invention relates to a composition adapted to be applied to metallic and refractory surfaces which receive molten or plastic glass thereon to prevent adhesion between the glass and such metallic or refractory surfaces and more particularly to an improved coating composition which is adapted to be applied to the interior surfaces of molds.

One object of my invention is to provide a process of treating metallic and refractory surfaces so that glass fired on such surfaces will not adhere thereto.

An understanding of my invention will be more readily apparent from the following detailed description in conjunction with the accompanying drawing, wherein:

Figure 1 is an isometric view showing a glass mold having its interior surfaces, base, and top coated with my improved composition;

Figure 2 is a cross-section taken substantially along the line II—II of Figure 1, showing the interior coated surfaces of a glass filled mold with its top thereon; and Figure 3 is an isometric view of a roller runway supporting a metal plate bearing a block of glass, the upper surface of the metal plate being coated with my improved composition to prevent adhesion between the plate and the lower surface of the block.

When glass sheets or blocks are heated to a temperature of about 1200° F. to 1700° F. the glass will stick or adhere to the surfaces of molds formed of refractory material in which they may be contained or they will stick to the metallic surface of metal roller conveyors on which they may be placed. In order to eliminate this adhesion between the glass and the refractory or metallic surfaces it has heretofore been the practice to apply a layer of sand or of alumina to such surfaces prior to the heating thereof. Such materials prevent adhesion between the glass and such surfaces but the molds or metallic surfaces must be coated with such material before each charge, or before the glass is placed on the metallic surface. This procedure is necessary because the materials partially flake off the mold surface or the metallic surfaces as the sand or alumina will adhere to the hot glass sheet or block rather than to the refractory or metallic surfaces on which it has been applied.

The present invention is based upon the discovery that by applying an aqueous suspension of a metallic ore, such as a suspension containing yellow ocher to the interior refractory surfaces of a mold or to a metallic surface, it will prevent adhesion between such surfaces and hot glass blocks or sheets, and that it is unnecessary to coat the surfaces before each charge of glass is placed thereon.

Referring to Figures 1 and 2 which illustrate the application of my improved adhesion-preventing composition to the base plate upon which a mold is placed, and to the interior surfaces of such mold, a base plate 1 is coated with an aqueous suspension of a metallic ore, such as yellow ocher. The suspension may be suitably prepared by stirring about 2 per cent to 50 per cent, by weight, of yellow ocher in water. The suspension may be brushed upon the upper surface of plate 1 and the interior surfaces 2 of mold 3, as well as upon the inside surface of a cover 4 for the mold and dried. In case the suspension is to be applied by spraying, it may suitably contain from about 2 per cent to 10 per cent, by weight, of yellow ocher. If less than 2 per cent, by weight, of yellow ocher is used, the suspension will not prevent adhesion while if more than 10 per cent is utilized, the suspension will be too thick to go through a spray gun.

Glass-forming ingredients 5 may be placed in the treated mold, as shown in Figure 2, and the mold may be fired in a manner well known in the art to produce a molded block of glass. The glass block may be readily removed from the mold without adhesion by removing the cover 4 and base 1, and sliding the block out. Another charge of glass-forming ingredients may be placed in the mold without again coating it, and the firing operation repeated.

Referring to Figure 3 which illustrates a block of glass 6 carried by a metal plate 7, which plate is coated with my improved adhesion-preventing composition by any of the above-described methods. The coated metal supporting plate 7 is carried by rollers 8. The rollers may carry the plate 7 and glass block 6 through a suitable annealing leer. The block 6 may be readily removed from the coated metal plate 7 without adhesion between the lower surface of the block 6 and the upper surface of the plate 7. Another block may then be placed upon the plate 7 without again coating the plate with the composition.

Where the term "yellow ocher" has been used, it will be understood to include either clay or calcium carbonate colored with about 20 per cent, by weight, of hydrated ferric oxide and having a fusing temperature greater than that of glass. Also, it will be understood that other similar siliceous iron ores may be suitably utilized in my improved coating composition for molds and metallic surfaces.

In my non-adhesive coating composition, the clay may vary from 40 per cent to 80 per cent, by weight, and the ferric oxide present may vary from 13 per cent to 40 per cent, by weight. The following is a typical analysis of the yellow ocher used:

| | Per cent by weight |
|---|---|
| $Fe_2O_3$ | 15 |
| $TiO_2$ | 1 |
| Insoluble matter | 77.5 |
| Ignition loss | 6.5 |

The foregoing detailed description has been given for clearness of understanding only and no limitations should be imposed upon the appended claims which should be construed as broadly as permissible in view of the prior art.

What I claim is:

1. A glass forming mold comprising inner walls of refractory material for containing molten glass to be molded therein, and a coating of finely divided siliceous iron ore applied in the form of a liquid suspension on the inner sides of said walls for drying thereon and when dried having non-adherent characteristic with respect to melted and molded glass.

2. A glass forming mold comprising inner walls of refractory material for containing melted glass to be molded therein, the inner wall sides having painted thereon a coating applied in the form of an aqueous suspension which when dry is non-adherent to melted and molded glass and containing approximately 2% to 50% by weight of yellow ocher.

ELMER H. HAUX.